United States Patent [19]

Varshneya et al.

[11] Patent Number: 4,552,577
[45] Date of Patent: Nov. 12, 1985

[54] METHOD OF PRODUCING SHAPED FOAMED-GLASS ARTICLES

[75] Inventors: Deepak Varshneya, Washington, D.C.; Pedro B. Macedo, 6100 Highboro Dr., Bethesda, Md. 20817; Robert K. Mohr, Washington, D.C.

[73] Assignees: Pedro B. Macedo, Bethesda; Theodore A. Litovitz, Annapolis, both of Md.

[21] Appl. No.: 482,231

[22] Filed: Apr. 5, 1983

[51] Int. Cl.⁴ .............................................. C03B 19/08
[52] U.S. Cl. .......................................... 65/22; 106/74; 501/84
[58] Field of Search .................. 65/22; 106/74; 501/84

[56] References Cited

U.S. PATENT DOCUMENTS

| | | | |
|---|---|---|---|
| 2,237,037 | 4/1941 | Lytle | 65/22 |
| 2,310,457 | 2/1943 | Owen | 65/22 X |
| 2,322,581 | 1/1943 | Lytle | 65/22 X |
| 3,443,920 | 5/1969 | Overcashier et al. | 65/22 |
| 3,870,496 | 3/1975 | Cutler | 65/22 |
| 4,059,425 | 11/1977 | Brydges, III et al. | 65/22 |

OTHER PUBLICATIONS

Report No. EPA-600/3-77-030, Oakseson et al., issued Aug. 1977.

*Primary Examiner*—Robert Lindsay
*Attorney, Agent, or Firm*—Fleit, Jacobson, Cohn & Price

[57] ABSTRACT

The present invention is directed to a method and apparatus for forming shaped foamed-glass articles. Glass particles are introduced to a pressure vessel in the presence of water. A pressure is applied to the pressure vessel sufficient to permit entrapment of water during sintering and sufficient to prevent foaming at processing temperatures. The temperature of the glass is increased to cause the glass to sinter and entrap water. The temperature of the glass is then increased to its fining temperature ($T_F$) for a sufficient time to fine the glass. The temperature of the glass is reduced to its pressure release temperature ($T_{PR}$). The pressure on the glass containing water is then reduced such as by extrusion to cause controlled foaming of the glass to occur. The glass is then cooled preferably by annealing to form the shaped foamed-glass article, typically pipe insulation.

28 Claims, 1 Drawing Figure

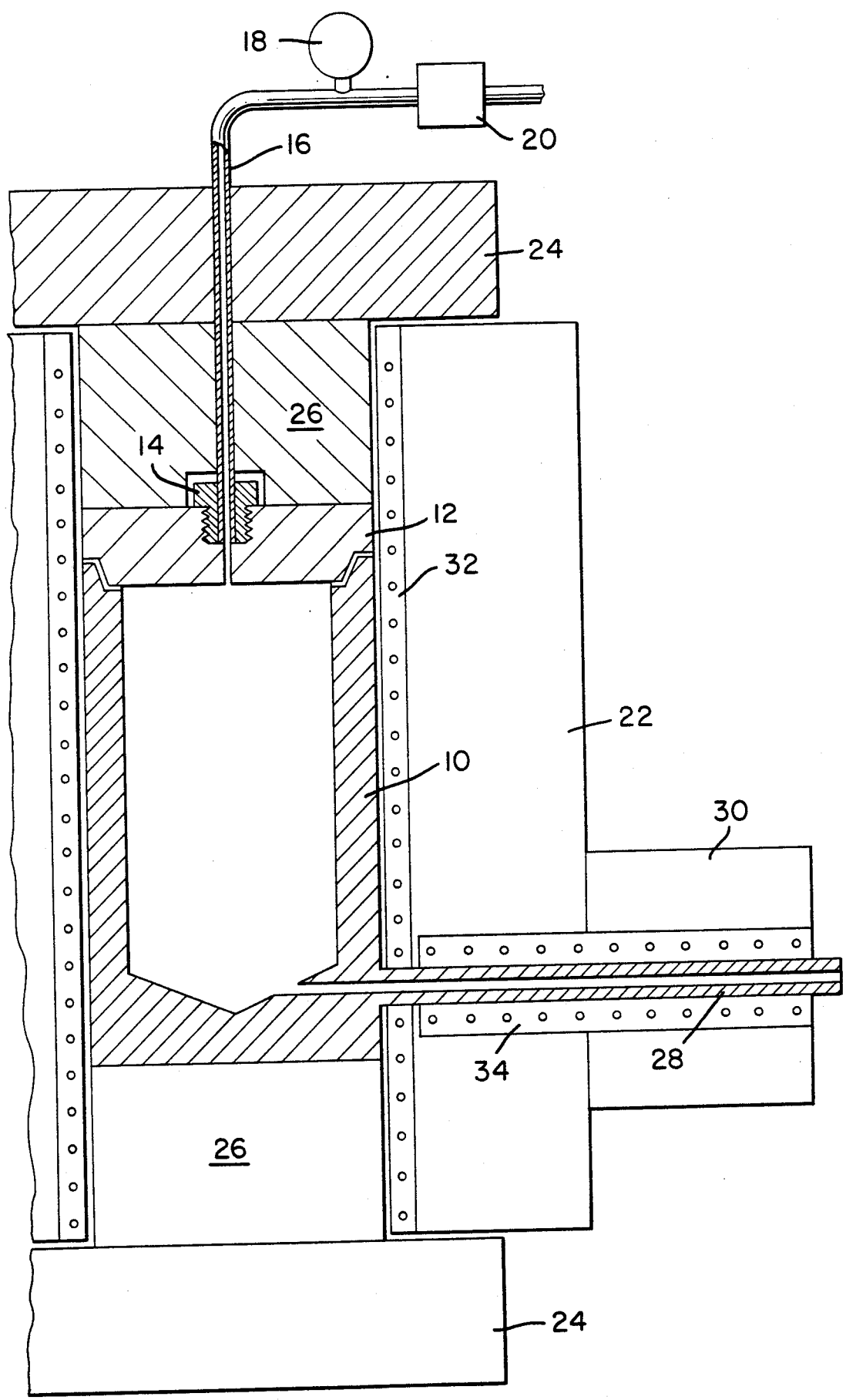

METHOD OF PRODUCING SHAPED FOAMED-GLASS ARTICLES

BACKGROUND OF THE INVENTION

1. Field of the Invention

The present invention relates to a method for the production of shaped foamed-glass articles having essentially uniform cellulation and useful as insulators against thermal and sound transmission and as light weight building materials such as pipe insulation.

It is well known that cellular or porous materials comprising a solid or fibrous material containing small interstices or cells filled with partially or completely entrapped air or other gaseous medium possess exceptional value as insulating media against the transmission of heat and sound. Asbestos (a carcinogen), cellulose fibers, and cellular material such as cork and organic polymer foams are representative of prior art efforts to produce insulative bodies. However, none of these materials is entirely satisfactory, asbestos being fairly expensive, lacking in mechanical strength, and having the additional disadvantage that it tends to compress during use, thereby losing at least a portion of its insulative value, and the organic materials lacking in resistance to heat, fire and chemicals. Consequently, foam glass materials have become of increasing importance as thermal insulators due to the inherent properties of low thermal conductivity and high resistance to chemical corrosion and fire. However, due to high cost of production, as well as unsatisfactory methods of production, these foam glass materials have not been generally adopted by the industry, which has continued to use the more common asbestos, cork, polymer foam or cellulose fiber materials, notwithstanding the failure of such materials to possess the required properties.

One reason for industry's decision to continue to utilize these less than optimum materials is the cost factor. Production methods wherein foamed glass blanks are formed and then machined to the appropriate shape result in such expensive labor costs and such a high waste factor as to render these methods commercially unacceptable.

Efforts to extrude shaped foamed-glass articles have not met with commercial acceptance. Production of shaped foamed-glass articles wherein an unfoamed molten glass is extruded into an area of reduced pressure, whereupon foaming occurs, must deal with the following problems. The presence of entrained gas bubbles, under pressure, in the melt prior to extrusion, results in a foam product having such non-uniform cellulation as to make it unsatisfactory. In order to remove such entrained gases in a reasonable period of time, the viscosity of the molten glass must be reduced to a range of below $10^3$ poise. However, one cannot foam the glass at such a viscosity range, the cellulation at this viscosity range being uncontrollable. To achieve satisfactory cellulation, a viscosity in the range of $10^5$ to $10^7$ poise is required. A temperature reduction of about 200°-300° C. is required to increase the viscosity to the range of $10^5$ to $10^7$ poise. An additional factor which must be taken into consideration is that foaming must not occur prior to extrusion. Foaming can be controlled by application of a pressure sufficient to inhibit gas formation of the foaming agent.

Therefore, in order to prepare shaped foamed-glass articles by extruding foamable molten glass compositions, containing a foaming agent, into an area of reduced pressure, whereby foaming occurs, it is necessary to (1) remove all entrained gas bubbles prior to extrusion, (2) completely inhibit gas formation prior to extrusion and, (3) extrude the molten glass into an area of reduced pressure, where foaming occurs. It is also essential that the particular foaming agent in question actually produce a gas at the extrusion temperature having a vapor pressure greater than one atmosphere, preferably more than two atmospheres (30 psia). Otherwise, if the vapor pressure of the gas produced by the foaming agent does not exceed the atmospheric pressure of the area into which the molten glass is extruded, no foaming will occur.

DESCRIPTION OF THE PRIOR ART

Various methods have been suggested for preparing cellular glass bodies by incorporation of foaming, gassing or blowing agents, the terms being synonymous for the purposes of this disclosure. One method involves the incorporation of carbon in the form of charcoal into molten, or at least softened, glass. This material, by reason of heat and chemical action, is decomposed in the viscous melt to liberate carbon dioxide or carbon monoxide as more or less uniformly distributed bubbles. However, this method is difficult to control during an extrusion operation.

A second method involves subjecting relatively fluid glass to vacuum whereby absorbed or entrapped gases are liberated as enumerable small bubbles distributed throughout the mass. This method has several disadvantages, foremost of which is the inability to obtain foam glass materials having a sufficiently low density and thus poor insulation properties.

Lytle, U.S. Pat. No. 2,322,581, discloses a method for producing foam glass whereby glass in a relatively finely divided condition is mixed with a gassing agent designed to decompose at or near the softening temperature of the glass. The only gassing agent disclosed is $CaCO_3$. See column 2, lines 23-26. The mixture is then further heated and extruded through a suitable orifice as a continuous stream under such conditions that the liberated gases expand after extrusion to form a highly porous refractory sheet or strip which may be cut into blocks or slabs of suitable dimensions. Aside from the disadvantage of having to mix the decomposable blowing agent with the glass, the quality of the material produced is inferior because of poor distribution of the bubbles, resulting in high density foaming bodies which cannot be readily cut, nailed or shaped. Shaping can only be accomplished by machining which is extremely expensive and time consuming.

Additionally, Lyttle teaches directly away from the use of water as the gassing agents, suggesting at page 2, lefthand column, lines 21-22, that the glass might be preheated to 1000° to 1200° F., a temperature range at which all water would be driven off. Further, Lyttle never recognized the importance of fining the molten glass prior to its extrusion or the advantages derived from the use of water as a gassing or foaming agent.

Overcashier et al, U.S. Pat. No. 3,443,920, discloses a method of forming foam glass by mixing raw glass with a blowing agent such as barium carbonate or strontium carbonate, heating the mixture under a highly pressurized atmosphere containing $CO_2$, and then reducing the pressure. Overcashier et al recognize that decomposable blowing agents such as calcium carbonate have been used in pressurized atmospheres which inhibit blowing gas expansion without prohibiting decomposition of the blowing agent. In the Overcashier et al invention, a highly pressurized atmosphere is employed such that the partial pressure is above the blowing agent decomposition level until the melt reaches the desired cellating viscosity level. As a result, extremely high pressures may be required. For example, if a glass is used such as one which requires a temperature of 1000° C. to reduce the viscosity to the fining level of $10^3$ poises, a $CO_2$ confining pressure in excess of 10,000 psia is required to prohibit dissociation if the blowing agent is strontium carbonate. Since such pressures are greatly in excess of practical structural limits for the pressure vessels involved, Overcashier et al recommend using another blowing agent such as barium carbonate. This blowing agent only requires a $CO_2$ pressure of 18 psia to prohibit dissociation of the blowing agent at 1000° C. See column 4, lines 52–62. However, this is not a practical solution. While barium carbonate requires a pressure of only 18 psia to prohibit dissociation at 1000° C., the pressure must be reduced to less than atmospheric pressure to generate foam at the pressure release temperature (i.e., about 800° C.). See curve C of FIG. 2. Therefore, unless the glass were extruded into a partial vacuum, no foaming would result.

Overcashier et al does recognize the desirability of fining. See column 5, lines 10–36. However, the initial charge may require 30 hours for this fining cycle at a melt viscosity of approximately $10^3$ poises. Moreover, Overcashier et al actually uses a small amount of gas originally occluded in the raw glass batch and subsequently dissolved therein upon fusion of the glass batch particles in the foaming or cellation of the glass melt. See column 3, lines 1–10.

Overcashier et al does briefly refer to blowing agents such as magnesium hydroxide, calcium hydroxide, strontium hydroxide and barium hydroxide which decompose to generate $H_2O$ gas by a dissolution reaction of the blowing agent. See column 2, particularly lines 34–35, and 70–72. In such a case, the pressurizing gas is water vapor. The patent contains no working example or data directed to this embodiment and does not claim the use of hydroxide blowing agents. Moreover, the practice of this embodiment is not practical. At the temperature of decomposition of magnesium hydroxide (i.e., 350° C.), the vapor pressure of water is almost 2400 psi, a pressure far in excess of the practical structural limits for pressure vessels. In fact, the apparatus disclosed by Overcashier et al is not suited for use of a blowing agent which generates $H_2O$ and the use of a pressurized gas which is water vapor. The crucible 6 is open-ended and the main pressure vessel 7 is cooled by cooling water circulated through the coils 13. Thus, water vapor would condense within the main pressure vessel. Additionally Overcashier et al require that the pressurizing gas be chemically the same as the gas produced by the blowing agent. See column 2, lines 39–48.

Brydges et al, U.S. Pat. No. 4,059,425 is directed to a process for steam hydrating alkali silicate glass, utilizing steam to both hydrate and extrude the glass. Brydges et al utilize large amounts of water to achieve thermoplasticity of the glass, operating at temperatures far below the fining and foaming temperatures of glass, generally operating below the softening temperature of the glass. The disclosure of Brydges et al is completely silent as to the fining step required to practice this invention. The product resulting from Bridges et al is a completely different product, containing up to 30% water, than that produced herein. The product will have poor chemical durability and mechanical strength. Further the claim of Brydges et al requires as a first step, forming anydrous bodies. In the practice of the present invention, it is essential that the glass contain water in a chemically combined state.

Oakseson et al, Report No. EPA-600/3-77-030, August, 1977, reported the results of some experimental work done for the Environmental Protection Agency wherein the feasibility of producing foam glass insulation from waste glass was explored. The report concluded that large amounts of water could be rapidly incorporated into glass by using a sodium hydroxide or sulfuric acid solution in a heated autoclave. The thus treated glass is then introduced into a furnace and heated to about 900° C. whereupon foaming occurs. The authors concluded that using sodium hydroxide sulfuric acid solutions made it possible to put enough water into glass to foam it and that foaming of very small particles of glass is possible when using water as the foaming agent. No disclosure of the use of pressure at high temperatures or the formation of shaped bodies is contained in the report.

Therefore a need has continued to exist for a method of producing shaped foamed-glass articles having essentially uniform cellulation, said method being both economic and efficient.

SUMMARY OF THE INVENTION

It is an object of this invention to produce glass foam having uniform cell size and cell distribution over a widely selective range of product density.

It is a further object of this invention to produce shaped foamed-glass articles having a uniform cross section.

It is yet another object of this invention to provide a method for producing shaped foamed-glass articles having reproducible density and structure.

It is yet another object of this invention to provide a method for producing shaped foamed-glass articles which do not require additional machining or shaping.

It is yet another object of this invention to provide a method for producing shaped foamed-glass articles wherein water is used as the foaming agent.

It is yet another object of this invention to provide a method for producing shaped foamed-glass articles wherein temperature and pressure limitations are maintained at levels commensurate with practical structural limitations of the processing apparatus.

It is yet another object of this invention to provide a method for producing shaped foamed-glass articles wherein removal of entrained gases can be achieved within an economically practical time frame.

It is yet another object of this invention to provide a method for producing shaped foamed-glass articles which will permit the shaped foamed-glass articles such as pipe insulation to be produced at a cost competitive with prior art insulative bodies other than foamed glass.

It is yet a further object of this invention to provide an apparatus for producing shaped foamed-glass articles.

It is a yet a further object of this invention to provide an apparatus for producing shaped foamed-glass articles, said apparatus constructed in a manner, and of materials, which are economically practical.

It is yet a further object of this invention to provide an apparatus for producing shaped foamed-glass articles wherein said apparatus includes a pressure vessel for receiving glass particles, means for pressurizing said pressure vessel, and means for heating said pressure vessel including a heating means substantially surrounding said pressure vessel, and means for discharging said pressure vessel including a nozzle means having a temperature which is independently controllable from said pressure vessel.

The present invention is directed to extruding foam glass bodies. The advantage of extruding over casting is that many simple elongated shapes can be made requiring a minimum of machining of the foamed glass. The foaming agent for extrusion has to have a vapor pressure which is relatively insensitive to temperature as compared to conventional foaming agents.

Thus, the present invention is based on the discovery that water, in combination with glass, is a superior foaming agent for extrusion to the foaming agents of the prior art. Water is a readily available and inexpensive foaming agent. It is easily combined with glass and, in fact "off-the-shelf" glass has often been found to have sufficient water to be suitable for practicing the invention. Water also permits a relatively low pressure to be used in the pressurized atmosphere during processing. Thus, the glass can be fined while foaming is suppressed at relatively low pressure, well within practical structural limits for pressure vessels. Also, water produces a gas at the extrusion temperature having a vapor pressure greater than atmospheric pressure thereby permitting foaming under atmospheric pressure. Stated in a different manner, the vapor pressure change, relative to temperature, of water is smaller than that of $CO_2$ which is generated by blowing agents such as calcium carbonate. Thus, water offers a number of significant processing advantages making it an extremely attractive foaming agent for glass.

Moreover, the method of forming shaped foamed-glass articles in accordance with the invention is simple and straight forward. The method broadly comprises introducing glass particles to a pressure vessel in the presence of water, applying a pressure to said pressure vessel sufficient to permit entrapment of water during sintering, increasing the temperature of said glass in said pressurized vessel to cause said glass to sinter and entrap water, increasing the temperature of said glass in said pressurized vessel for a sufficient time to fine said glass, reducing the temperature of said glass to its extrusion temperature, extruding glass containing water into an area of reduced pressure, whereby controlled foaming of said glass occurs, and annealing said foam glass so as to relieve stress and prevent cracking. Using this method, a shaped foam-glass article having reproducible density and structure can be prepared, the shaped foam-glass article requiring no or little additional machining or shaping to produce the final product.

BRIEF DESCRIPTION OF THE DRAWINGS

A more complete description of the drawing and many of the attendant advantages thereof will be readily obtained as the same becomes better understood by reference to the following detailed description when considered in connection with the accompanying drawings, wherein the FIGURE is an apparatus for producing shaped foamed-glass articles.

DESCRIPTION OF THE PREFERRED EMBODIMENTS

Referring now to the FIGURE, in a typical run, glass particles and water are loaded into a pressure vessel 10, said pressure vessel 10 having a recessed top end for gas sealing purposes. A lid 12, machined to have a lip on its bottom surface which fits into the container 10 with a graphite gasket (not shown) is provided for said pressure vessel 10. The lid also has a hole in its center, said hole provided with a high pressure fitting 14 and a tube 16 on its top end through which pressurizing gas is passed. Said tube 16 is fitted with a pressure guage 18 and a pressure-control valve 20. The system is placed in the center of a cylindrical furnace 22, said cylindrical furnace being held between fire brick-lined plattens 24 of a hydraulic press, not shown. Spacers 26 on the top of the lid and the bottom of the container are provided to transmit the pressure from the press to the lid. The container and the lid are sealed by closing the press, which provides the end load. To minimize thermal edge effects, fire bricks, for example Mullite, which are good pressure transmitters even at high temperatures, are used for lining both the plattens. A tube 28 is provided for withdrawing materials from the vessel 10, said tube 28 passing through a separate furnace, said furnace 30 capable of being maintained at a temperature different from that of furnace 10. Heating elements 32 and 34 provide the heat supply for furnaces 10 and 30, respectively. Heating elements 32 and 34 are independently controllable, thereby providing the independent temperature control of furnaces 10 and 30 respectively, referred to above.

In order to pressurize the extruder containing the powdered glass, it is necessary to seal the nozzle 28. This is accomplished by heating the vessel containing the glass without pressure to approximately the glass melting point. While the temperature of the container is being raised, the nozzle is kept at about 300° to 400° C. This prevents the glass from flowing out of the nozzle and thus forms a glass to metal seal which does not rupture even with the pressures utilized in the practice of this invention. Such a seal is widely used in glass industry where the flow of glass through an orifice is regulated.

In a typical run, the pressure vessel, with the nozzle of the extruder sealed, is batch-loaded with the powdered glass and water at room temperature. The lid and container are sealed by applying an end load pressure from the hydraulic press and the vessel is pressurized with gas at room temperature through tube 16. The temperature of the pressurized container is raised to the fining temperature ($T_F$) while at the same time maintaining the pressure within the desired range by means of the pressure control valve and the temperature of the nozzle at about 400° C. After soaking, the container at this temperature is cooled and equilibrated at the pressure release temperature ($T_{PR}$). The pressure regulating valve functions to maintain the pressure in the pressure vessel to a predetermined level. Pressurizing gas and excess water, in the form of water vapor, are vented through the pressure regulating valve, while, at the same time, the water vapor level within the pressure vessel is maintained at the level necessary to produce the foamed glass upon extrusion. The nozzle is then heated to the pressure release temperature as well. During the course of heating the nozzle, the glass under pressure begins to flow out of the nozzle slowly, whereupon it foams. The extruded foam article, having a uniform cross section, is further annealed and cooled.

In order to change the extrusion apparatus in the FIGURE from a batch process to a continuous one, the following modifications are necessary:

(1) Add means to feed either wet glass or glass and water at relatively low temperature to the pressure vessel without releasing the pressure.

This can be done by a second pressure vessel connected to the first by a tube with a bore large enough to pass powdered glass. This second vessel does not have to sustain pressure at high temperatures. The tube interconnecting the pressure vessels is closed by means of a valve. Next the powdered glass is added to the second vessel—preferably with water ("wet glass"). The second vessel (cold) is closed and pressurized to about the same pressure as the first vessel or to excess. The valve in the interconnecting tube is opened and means are provided to transfer the glass into the first vessel. The means can be gravity feed, screw feed, vibrational feed or pressure feed. A separate pressure line into the first vessel can keep the pressure constant during the feed operation in order to maintain a constant extrusion rate.

(2) Fining means—The first (hot) vessel should be large enough such that the residence time of the glass at the fining temperature is sufficient to fine the glass. The residence time in the vessel is the volume of the vessel divided by the flow rate of solid glass at extrusion. For example, if one produces 100 cubic feet per day of foam glass, one needs approximately 5 cubic feet per day of molten glass to pass the extruder or a rate of about 0.2 cubic feet per hour. If fining can be accomplished in 1 hour (for viscosities $<10^2$ poise), then the vessel will have a volume of about 0.2 cubic feet. More important it will have a volume of 1/500 or 0.002 of the amount of glass foam one wants to produce per day. The reciprocal of this number, 500, is the Figure of Merit (FM). The larger FM the more economical the process. Thus, the shorter the fining time the better. The following can be done to reduce the fining time:

(i) Lower the viscosity of the glass by changing composition or increasing temperature;

(ii) Bubble gas through the melt—large bubbles of gas rise faster than small bubbles. The large bubbles will sweep the small bubbles up and clear the melt;

(iii) Stir the melt;

(iv) Pass the glass melt through a "neck"—a constriction where the glass flows vertically at higher speeds and lower viscosities;

(v) Conduct the fining in two stages, a higher temperature stage and then a lower temperature stage in which the small bubbles are reabsorbed; and (iv) Add chemicals to the glass that will absorb gases. Chemicals that go to a higher oxidizing state will absorb oxygen.

By glass is meant ceramic materials consisting of a uniformly dispersed mixture of $SiO_2$ along with other ingredients. Typical proportional ranges for the glass compositions contemplated for this invention include, but are not limited to:

|  | wt. % |
|---|---|
| $SiO_2$ | 35–75 |
| $B_2O_3$ | 0–45 |
| $R_2O$ | 5–30 |
| AO | 0–20 |
| XO | 0–10 |
| PbO | 0–40 |
| $GeO_2$ | 0–25 | where $R_2O$ means alkali metal oxides, AO represents alkaline earth oxides and XO means $Al_2O_3$, $ZrO_2$, $TiO_2$, and $La_2O_3$. Preferred proportions are as follows:

|  | wt. % |
|---|---|
| $SiO_2$ | 35–60 |
| $B_2O_3$ | 10–40 |
| $R_2O$ | 6–30 |
| XO | 1–5 |
| AO | 0–10 |

Suitable for use in this invention are those glass particles having a particle size of less than about 1.7 mm. Preferred particle sizes are in the range of less than about 500 um. The most preferred particle sizes are in the range of less than about 45.

By pressure vessel is meant any vessel capable of being pressurized and heated to the pressure ranges and temperature ranges encompassed by the practice of this invention. Suitable materials are alloys which have superior strength and corrosion resistance at high temperatures. These materials include stainless steel, nickel-chromium alloys, and nickel-copper alloys and carbides such as tungsten carbides. A suitable vessel design is shown in the FIGURE.

The following information was utilized in the construction of the pressure vessel employed in the examples which follow. Since internal pressurization of the vessel would create stresses in the material, it was required to determine the wall thickness which would allow safe operation under the conditions stated above. The radial stress is always equal and opposite to the applied pressure and plays no role in the estimation of wall thickness. However, the tangential stress or the hoop stress in a hollow cylindrical vessel subjected to an internal pressure is related to the wall thickness and is given by the relation, $$S = \frac{P(a^2 + b^2)}{b^2 - a^2},$$

where P=internal pressure, a and b are the inner and outer diameters, respectively. Using this relation, one can estimate the wall thickness of the vessel provided the appropriate hoop stress is known. From the available data on the rupture properties of INCONEL 600, a nickel-chromium alloy available from International Nickel Co., Inc., a hoop stress value of 600 psi was chosen which would allow safe operation at 1000° C. for a minimum period of 100,000 hours. Using this value of the hoop stress, 200 psi for P and 3¼" for a, b was calculated to be about 5". This results in a ¾" wall thickness.

The amount of water required for the practice of this invention varies over a fairly wide range. Foams of excellent quality may be prepared from glass particles containing as little as 0.1% water or less. At the other end of the range, glass particles containing as much as 7% or more of water have been found to be suitable. The preferred water content is in the range of less than about 1%.

Water may be added to the glass particles in a number of ways. In one embodiment of this invention, glass particles are ground in the presence of water. Suitable grinding apparatus include ball, vibrating, hammer, pebble, pin and attrition mills, roll crushers and airjet pulverisers and the like.

In another embodiment of this invention, dried glass particles of the appropriate size were introduced into the pressure vessel in the presence of the appropriate amount of water. Foams of excellent quality were produced by this method.

Surprisingly, it was found that this invention can be practiced by the utilization of "off the shelf" glass particles. Apparently, the glass particles stored in bottles on the shelf absorb enough water from the atmosphere to provide the needed amount of water for the practice of this invention. Thus a very simple method of the practice of this invention involves the addition of glass particles from shelf-stored container vessels to the pressure vessel followed by subsequent pressurization and heating. This is in marked contrast to prior art methods involving the careful and protracted mixing of glass particles and foaming agents.

The amount of pressure required for the practice of this invention varies over a wide range. The purpose of the pressure is two fold. In the initial heating stages, pressure is required in order to maintain water sorbed on the glass particles. Once the glass has reached its sintering temperature, and coalescing begins, pressurization within the pressure vessel maintains water in a chemically combined, non-gaseous state, thereby preventing premature foaming of the coalesced glass to occur in the pressure vessel. The object of the practice of this invention is to inhibit foaming of the glass while said glass is maintained within the pressurized vessel, the foaming occuring only after said glass is extruded into an area of reduced pressure, outside the pressure vessel.

Pressures suitable for the practice of this invention are in the range of 50 to 800 psig. At pressures below 50 psig, however, it is difficult to obtain foams of good quality having a density of 10 lb/ft$^3$ or less. The only upper pressure limitations is the limitation imposed by the equipment itself, with higher temperatures and higher pressures requiring the use of special alloys or excessive wall thickness. The preferred pressure range is in the range of 50 to 200 psig. The most preferred pressure is in the range of 75 to 100 psig.

Pressurization is effected by the introduction of gas into the pressurized vessel. Suitable gases include carbon dioxide, nitrogen, argon, helium, air, oxygen and others. Carbon dioxide is the most preferred gas for the practice of this invention.

The glass particles are heated to the sintering point of said glass, that point at which the glass particles begin to coalesce, the purpose of this initial heating phase being to entrap the water in contact with the glass and prevent its evaporation. The temperature required by this initial heating phase will vary depending upon the composition of glass being employed in the practice of the invention. Typically, this temperature is in the range of about 400°–650° C.

Subsequent to the sintering of said glass, the temperature is further increased to the fining temperature ($T_F$) of said glass, that temperature at which molten glass gets sufficiently fluid for the bubbles in it to surface. The fining of the glass represents a very important aspect of this invention for the elimination of occluded gases and non-chemically combined water is essential in order to produce a foam having a fairly uniform pore size and satisfactory foam characteristics. If the glass is not fined and large bubbles exist in the molten pressurized glass, upon pressure release, these bubbles will significantly increase in size. Since the absolute pressure is being reduced by typically about 5 to 10 times, the bubble volume will grow by at least a factor of about 5 to 10 times which is about a factor of 2 in diameter without taking into account the additional gas-steam released due to pressure reduction. If this enlarged bubble is of the order of one-half centimeter or greater, it will substantially reduce the mechanical strength and increase the thermal conductivity of the final foam. Thus, the fining process for extruded foam glass need not completely eliminate all bubbles like in the case of optical quality glass but must eliminate large bubbles. It is understood that the fining temperature will vary, depending upon the particular glass and the amount of water being used. Typically the fining temperature is that temperature required to produce a viscosity in the range of about 10 to 10$^3$ poise, said temperatures usually being in the range of about 800° to 1200° C. To be commercially practical, fining should occur in one to two hours or less.

The molten glass is maintained at this fining temperature for a period of time sufficient to permit most entrained gas and non-chemically combined water to surface. The period of time required for this to occur is typically in the range of 5 to 20 minutes, but may be longer or shorter depending upon the specific viscosity and glass being utilized.

Following the fining process, the temperature is reduced to the pressure release temperature ($T_{PR}$). By pressure release temperature ($T_{PR}$) is meant that temperature which provides the appropriate viscosity for the extrusion of said molten glass through an orifice into an area of reduced pressure such that satisfactory foaming of said glass occurs. Again, this temperature is a function of the particular glass in question and the particular viscosity desired. Typical viscosities are in the range of about 10$^4$ to 10$^7$ poise and are achieved by temperatures within the range of about 600° to 900° C. Preferred viscosities and temperature ranges are 10$^{4.5}$ to 10$^{6.5}$ poise and 650° to 850° C., respectively. The most preferred viscosity and temperature ranges are 10$^5$ to 10$^6$ poise and 700° to 800° C., respectively. Cellulation or foaming of a melt may take place with the melt viscosity as high as 10$^{10}$ poises. Greater viscosities inhibit if not prohibit cell growth. Likewise, foaming may readily take place at viscosities as low as 10$^3$ poise, but cell growth is difficult to control at smaller viscosity values. Upon satisfaction of the foregoing conditions, the said partial pressure of the melt of the said atmosphere is suddenly reduced, as by extrusion of the melt through a die into a region of lower pressure, whereupon foaming occurs.

In one aspect of the practice of this invention, the product density may be controlled by controlling the temperature of the extruded product, temperatures maintained at higher levels resulting in increased foaming and a lower density, while descreased temperatures result in a decrease in the amount of foaming and subsequent densities in a higher range.

Also included in the contemplation of this invention is the use of multiple dies for further shaping of the extruded product. Ultimately, however, the resulting product is a shaped foam glass article having a uniform cross section.

The practice of this invention also contemplates the use of a subsequent annealing step to control and relieve internal stresses resulting from uneven cooling of the extruded articles. By annealing or controlled cooling of the extruded article, these internal stresses are relieved and cracking is essentially eliminated. This annealing process is well within the skill of the art and known to those that practice this art.

The foams which result from the practice of this invention have densities which are much reduced as compared to the densities of the starting glass particles. Typically, densities of the starting glass frit or particles are in the range of about 0.69 to 1.40 gm/cc (about 44 to 90 lb/ft$^3$) or higher. Typical densities achieveable by the foaming process of this invention are in the range of about 0.1 to 0.5 gm/cc (about 6.5 to 32 lb/ft$^3$). The shaped foamed-glass articles of this invention have excellent physical properties which make them very well suited for their intended utilities that is as insulative bodies against heat and sound as well as lightweight construction materials such as pipe insulation.

Further, it would appear that these shaped foamed articles of this invention actually comprise a series of vacuum pores within a glass matrix, the result of condensation of the water vapor within the pores and subsequent sorption of said water vapor into the surrounding glass matrix. As is well known in the insulation technology, foams wherein the interstices are vacuum as opposed to gas bubbles are better insulative bodies. Therefore a surprising and unexpected advantage resulting from the formation of glass foams according to the invention, as opposed to the formation of foams utilizing carbon dioxide foaming agent is that the insulative bodies of this invention should have superior insulative characteristics.

Having now generally described this invention, the same will be better understood by reference to certain specific examples, which are included herein for purposes of illustration only and are not intended to be limiting of the invention or any embodiment thereof, unless specified.

EXAMPLES 1 TO 44

The composition of the glass frits used are given in Table I in weight percent.

TABLE I

| Sample # | SiO$_2$ | B$_2$O$_3$ | Na$_2$O | K$_2$O | Al$_2$O$_3$ | CaO | Fe$_2$O$_3$ | MgO | LiO$_2$ | TiO$_2$ | La$_2$O$_3$ | Z$_2$O$_2$ |
|---|---|---|---|---|---|---|---|---|---|---|---|---|
| 1. | 53.5 | 36.2 | 3.8 | 5.9 | 0.55 | 0.6 | — | — | — | — | — | — |
| 2. | 72.6 | 0.8 | 15.2 | — | 1.7 | 4.6 | — | 3.6 | — | — | — | — |
| 3. | 75 | — | 25 | — | — | — | — | — | — | — | — | — |
| 4. | 57.9 | 14.7 | 17.7 | — | — | — | — | 2.0 | 5.7 | 1.0 | 0.5 | 0.5 |

The experimental procedure used in Experiments 1–46 was as follows. The glass was first ground and sieved to the frit size shown in Table II. The wet glass samples were prepared by one of two methods. In the first method, the glass was dried and then heated in a vacuum oven at 220° C. for two days. A known amount of water was physically combined with a known amount of dried glass. The dried glass frit was kept in a dessicator for two days and allowed to sorb water. The water content of the samples shown in Table II was determined by weighing the wet sample, drying the sample in a vacuum oven at 220° C., and reweighing the sample. In accordance with the second method, the glass was dried and a known amount of water was mixed with the glass.

The wet glass samples were placed in a pressure vessel generally of the type shown in the FIGURE except that the pressure vessel did not have a tube for withdrawing materials from the vessel. The pressure vessel was approximately 2" outer diameter, ⅝" inner diameter, 4" tall and had a base thickness of ¾". The pressure vessel was made of Inconel 600. The pressure vessel was pressurized with CO$_2$ gas at room temperature to the pressure shown in Table II. The temperature was then raised to the fining temperature (T$_F$) of 1000° C. and held between 5 and 20 minutes. The temperature was reduced to the pressure release temperature shown in Table II, which is the temperature at which extrusion would be conducted. The pressure was then released. After cooling, the density of the samples was measured. The results of these experiments are shown in Table II.

TABLE II

| Sample # | CO$_2$ Pressure (psig) | Pressure Release Temperature (°C.) | Example #$^{(a)}$ | Water Sorbed (Weight %) | Density (gm/cc) | Example #$^{(b)}$ | Density (gm/cc) |
|---|---|---|---|---|---|---|---|
| 1 | 300 | 750 | 1 | 3.4 | 0.16 | 24 | 0.26 |
| (≦45 μm) | 100 | 750 | 2 | 3.4 | 0.28 | 25 | 0.41 |
|  | 50 | 750 | 3 | 3.4 | 0.92 | 26 | 1.19 |
| 1 | 300 | 750 | 4 | 3.3 | 0.14 | 27 | 0.28 |
| (63–75 μm) | 100 | 750 | 5 | 3.3 | 0.18 | 28 | 0.26 |
|  | 50 | 750 | 6 | 3.3 | 1.38 | 29 | 0.43 |
| 1 | 300 | 750 | 7 | 1.74 | 0.29 | 30 | 0.19 |
| (240–500 μm) | 100 | 750 | 8 | 1.74 | 0.55 | 31 | 0.24 |
|  | 50 | 750 | 9 | 1.74 | 0.59 | 32 | 0.27 |
| 2 | 300 | 835 | 10 | 1.25 | 0.39 | 33 | 0.24 |
| (≦45 μm) | 100 | 835 | 11 | 1.25 | 0.33 | 34 | 0.43 |
|  | 50 | 835 | 12 | 1.25 | 0.52 | 35 | 0.34 |
| 2 | 300 | 835 | 13 | 0.13 | 0.83 | 36 | 0.39 |
| (250–500 μm) | 100 | 835 | 14 | 0.13 | 0.49 | 37 | 0.55 |
|  | 50 | 835 | 15 | 0.13 | 1.38 | 38 | 0.55 |
| 3 | 300 | 814 | 16 | 6.7 | 0.26 | 39 | 0.19 |
| (≦45 μm) | 100 | 814 | 17 | 6.7 | 0.46 | 40 | 0.52 |
|  | 50 | 814 | 18 | 6.7 | 0.52 | 41 | 4.09 |
| 3 | 300 | 814 | 19 | 1.5 | 0.21 | 42 | 0.17 |
| (250–500 μm) | 100 | 814 | 20 | 1.5 | 0.41 | 43 | 8.3 |
|  | 50 | 814 | 21 | 1.5 | 0.92 | 44 | 8.3 |
| 4 | 100 | 700 | 22 | 0.38 | 0.21 | — | — |

TABLE II-continued

| Sample # | CO$_2$ Pressure (psig) | Pressure Release Temperature (°C.) | Example #$^{(a)}$ | Water Sorbed (Weight %) | Density (gm/cc) | Example #$^{(b)}$ | Density (gm/cc) |
|---|---|---|---|---|---|---|---|
| ($\leq$63 µm) | 75 | 750 | 23 | 0.38 | 0.46 | — | — |

$^{(a)}$Dried glass frits were placed in a dessicator having saturated water vapor for 2 days.
$^{(b)}$0.5 cc. of water was mixed with 1 gm. of dry glass frit.

The following conclusions were reached based on Experiments 1–44 and the results shown in Table II:

(1) The preferred glass composition was composition 4. With this composition, low density foams could be obtained at relatively lower pressure release temperatures.

(2) While not indicated in Table II, the finer particles resulted in foams with more uniform pore distribution.

(3) The experiments showed that lower density foams were generally produced at the higher CO$_2$ pressures. Foams of satisfactory density and quality were consistently obtained at 100 psig.

(4) All of the pressure release temperatures used were within the preferred range. At least one satisfactory foam was produced at each of the pressure release temperatures. Although the fining temperature was between 150° and 300° C. higher than the pressure release temperature, sufficient foaming agent was retained during fining to successfully foam the glass at the lower pressure release temperature.

(5) The amount of water absorbed in the experiments varied from 0.13 to 6.7%. The experiments showed that more water was absorbed by the smaller particle size glass. The amount of water absorbed was a function of the composition of the glass.

EXAMPLE 45

Glass frit of composition 4 in Table I having a particle size passing through 200 mesh and having 0.4% sorbed water is batch loaded into the pressure vessel 10 shown in the FIGURE at atmospheric pressure. In order to pressurize the pressure vessel, it is necessary to seal the nozzel 28. This is accomplished by heating the pressure vessel containing the glass without pressure to approximately the glass melting point. While the temperature of the pressure vessel is being raised, the nozzle is kept at about 300° to 400° C. This prevents the glass from flowing out of the nozzle by forming a glass to metal seal which does not rupture even with a 400 psi pressure. The pressure vessel is cooled to room temperature. The pressure vessel with the sealed nozzle is batch-loaded with the glass frit having absorbed water at room temperature. The pressure vessel is sealed and pressurized to 100 psig with CO$_2$ gas at room temperature. The temperature of the container is raised to the fining temperature (T$_F$) of 1000° C. while the nozzle is maintained at about 400° C. After soaking the glass at this temperature for 2 hours, it is cooled and equilibrated at the extrusion temperature (T$_{ex}$) of 675° C. The nozzle is then heated to the extrusion temperature (T$_{ex}$) also. During the course of heating the nozzle, the glass under pressure begins to flow out of the nozzle slowly whereupon it foams. The foaming of the glass and the flow rate increases gradually with the increase in temperature until the extrusion temperature is achieved. The extruded foam rod is then annealed.

What is claimed is:

1. A method of forming shaped foamed-glass articles comprising:

(i) introducing glass particles to a pressure vessel in the presence of water;

(ii) applying a pressure to said pressure vessel sufficient to permit entrapment of water during sintering;

(iii) increasing the temperature of said glass in said pressurized vessel to cause said glass to sinter and entrap water;

(iv) increasing the temperature of said glass to its fining temperature (T$_F$) of about 800° to 1200° C. in said pressurized vessel for a sufficient time to fine said glass;

(v) reducing the temperature of said glass to its pressure release temperature (T$_{PR}$);

(iv) reducing the pressure on said glass containing water whereby controlled foaming of said glass occurs; and (viii) cooling to form said shaped foamed-glass article.

2. A method of forming shaped foamed-glass articles comprising:

(i) introducing glass particles to a pressure vessel in the presence of water;

(ii) applying a pressure to said pressure vessel sufficient to permit entrapment of water during sintering and sufficient to prevent foaming at processing temperatures;

(iii) increasing the temperature of said glass in said pressurized vessel to cause said glass to sinter and entrap water;

(iv) increasing the temperature of said glass to its fining temperature (T$_F$) of about 800° to 1200° C. in said pressurized vessel for a sufficient time to fine said glass;

(v) reducing the temperature of said glass to its pressure release temperature (T$_{PR}$) of about 600° to 900° C.;

(vi) extruding said glass containing water into an area of substantially atmospheric pressure whereby controlled foaming of said glass occurs; and (vii) annealing the extruded shaped foamed-glass article.

3. A method of forming shaped foamed-glass articles comprising:

(i) introducing glass particles to a pressure vessel in the presence of water;

(ii) applying a pressure to said pressure vessel sufficient to permit entrapment of water during sintering;

(iii) heating said glass in said pressurized vessel to sufficiently high temperature to cause said glass to sinter and entrap water;

(iv) heating said glass to decrease the viscosity of said glass to the range of about 10 to $10^3$ poise;

(v) increasing the viscosity of said glass into the range of about $10^4$ to $10^7$ poise;

(vi) reducing the pressure on said glass containing water whereby controlled foaming of said glass occurs; and (viii) cooling to form said shaped foamed-glass article.

4. A method of producing low density foam glass articles comprising:
(i) introducing glass particles having a particle size of not greater than 10 mesh, in the presence of about 0.1 to 7 weight percent of water, into a pressure vessel;
(ii) pressurizing said pressure vessel containing said glass particles with a gas to a pressure of about 50 to 800 psig;
(iii) raising the temperature of said glass in said pressurized vessel to a temperature of about 400° to 650° C., whereby said glass particles coalesce and entrap said water;
(iv) further increasing the temperature of said glass in said pressurized vessel to a temperature of about 800° to 1200° C.;
(v) maintaining said glass in said pressurized vessel at said higher temperature of step (iv) for sufficient time whereby fining of said entrained gases and non-chemically combined water occurs;
(vi) reducing the temperature of said glass in said pressurized vessel to a temperature in the range of about 600° to 900° C.;
(vii) extruding the glass of step (vi) through a shaping orifice into an area of reduced pressure, whereby foaming of said shaped glass article occurs; and
(viii) cooling to form said shaped foamed-glass article.

5. The method of claims 1, 2, 3 or 4 wherein the glass is selected from glass compositions comprising, in weight percent, about 35 to 75% $SiO_2$, about 0 to 45% $B_2O_3$, about 5 to 30% $R_2O$, about 0 to 20% AO, about 0 to 10% XO, about 0 to 40% PbO, and about 0 to 25% $GeO_2$ wherein $R_2O$ is an alkali metal oxide, AO is an alkaline earth metal oxide, and XO is $Al_2O_3$, $ZrO_2$, $TiO_2$ or $La_2O_3$.

6. The method of claim 5 wherein the glass is selected from glass compositions comprising, in weight percent, about 35 to 60% $SiO_2$, about 10 to 40% $B_2O_3$, about 6 to 30% $R_2O$, about 1 to 5% XO and about 0 to 10% AO.

7. The method of claims 1, 2, 3 or 4 wherein the glass has a particle size 45 um of about 1.7 millimeter.

8. The method of claim 7 wherein the glass has a particle size of about 45 to 500 um.

9. The method of claims 1, 2, 3 or 4 wherein water is added as water surface-adhered to the glass particles or as a separate addition to the pressure vessel.

10. The method of claim 9 wherein the water is surface-adhered to the glass particles.

11. The method of claim 9 wherein the water is added as a separate addition to the pressure vessel.

12. The method of claim 1, 2 or 3 wherein water is added in an amount, based on the weight of glass particles, of about 0.1 to 7 weight %.

13. The method of claim 12 wherein water is added in an amount of less than about 1%.

14. The method of claim 1, 2, 3 or 4 wherein the pressure in the pressure vessel is applied by introduction of a gas.

15. The method of claim 14 wherein the gas is carbon dioxide, nitrogen, argon, helium, air or oxygen.

16. The method of claim 14 wherein the gas is carbon dioxide.

17. The method of claims 1, 2, 3 or 4 wherein the pressure in (ii) is in the range of about 50 to 800 psig.

18. The method of claim 17 wherein the pressure in (ii) is in the range of about 50 to 200 psig.

19. The method of claims 1, 2, 3 or 4 wherein the temperature of (iii) is in the range of about 400° to 650° C.

20. The method of claims 3 or 4 wherein the fining temperature ($T_F$) of (iv) is in the range of about 800° to 1200° C.

21. The method of claims 1, 2, 3 or 4 wherein the pressure release temperature ($T_{PR}$) is about 600° to 900° C.

22. The method of claim 21 wherein the pressure release temperature ($T_{PR}$) is about 650° to 850° C.

23. The method of claim 21 wherein the pressure release temperature is about 700° to 800° C.

24. The method of claims 1, 3 or 4 wherein said area of reduced pressure is atmospheric pressure.

25. The method of claims 1, 3 or 4 further including the step of annealing the extruded shaped foamed-glass article.

26. The method of claims 1, 2, 3 or 4 wherein the shaped foamed-glass article is pipe insulation.

27. The method of claim 3 wherein the viscosity of the glass is increased into the range of about $10^{4.5}$ to $10^{6.5}$ poise.

28. The method of claim 3 wherein the viscosity is increased into the range of about $10^5$ to $10^6$ poise.

* * * * *